(12) United States Patent
Heyd et al.

(10) Patent No.: US 10,739,163 B2
(45) Date of Patent: Aug. 11, 2020

(54) SENSOR ASSEMBLY FOR DETERMINING A NUMBER OF ROTATIONS OF A PERMANENT MAGNET

(71) Applicant: Schaeffler Technologies AG & Co. KG, Herzogenaurach (DE)

(72) Inventors: Jean-Francois Heyd, Strasbourg (FR); Wai-Wai Buchet, Strasbourg (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/316,811

(22) PCT Filed: Aug. 10, 2017

(86) PCT No.: PCT/DE2017/100676
§ 371 (c)(1),
(2) Date: Jan. 10, 2019

(87) PCT Pub. No.: WO2018/041296
PCT Pub. Date: Mar. 8, 2018

(65) Prior Publication Data
US 2019/0234761 A1 Aug. 1, 2019

(30) Foreign Application Priority Data
Aug. 30, 2016 (DE) .................. 10 2016 216 326

(51) Int. Cl.
*G01D 5/12* (2006.01)
*G01D 5/14* (2006.01)
(Continued)

(52) U.S. Cl.
CPC ............... *G01D 5/12* (2013.01); *F16D 23/12* (2013.01); *F16H 25/2015* (2013.01);
(Continued)

(58) Field of Classification Search
CPC ...... G01D 5/145; G01D 5/2457; G01P 3/487; G04C 5/00; H02K 49/102
See application file for complete search history.

(56) References Cited

U.S. PATENT DOCUMENTS

| 5,602,472 A | * | 2/1997 | Bergstedt | ................ G01P 3/487 |
| | | | | 188/181 R |
| 2009/0146651 A1 | * | 6/2009 | Hatanaka | ................ G01D 5/145 |
| | | | | 324/207.25 |
| 2018/0356253 A1 | * | 12/2018 | Hammerschmidt | ... G01D 5/145 |

FOREIGN PATENT DOCUMENTS

DE 10334869 B3 9/2004
DE 102009039574 A1 3/2010
(Continued)

*Primary Examiner* — Tung X Nguyen
(74) *Attorney, Agent, or Firm* — Kevin L. Parks

(57) ABSTRACT

A sensor assembly for determining a number of rotations of a permanent magnet includes a first sensor. The permanent magnet has an axis of rotation, end surfaces lying in an X-Y plane, a central axis, and exactly two poles. The two poles are disposed in the X-Y plane on mutually opposite sides of the permanent magnet so that the permanent magnet is magnetized diametrically. The first sensor is axially fixed and rotationally displaceable relative to the permanent magnet. The first sensor is disposed at a first distance axially offset from the permanent magnet and at a second distance radially offset from the axis of rotation. The second distance is selected so that a vector sum of a radial flux density and a tangential flux density is not less than a first limit value and does not exceed a second limit value.

8 Claims, 2 Drawing Sheets

(51) Int. Cl.
*F16D 23/12* (2006.01)
*F16H 25/20* (2006.01)
*F16H 25/22* (2006.01)

(52) U.S. Cl.
CPC ....... *G01D 5/145* (2013.01); *F16D 2023/123* (2013.01); *F16D 2300/18* (2013.01); *F16H 25/2252* (2013.01)

(56) References Cited

FOREIGN PATENT DOCUMENTS

| | | |
|---|---|---|
| DE | 102014116844 A1 | 6/2015 |
| DE | 102016212829 A1 | 2/2017 |
| EP | 1610095 A1 | 12/2005 |
| WO | 2015117612 A1 | 8/2015 |

\* cited by examiner

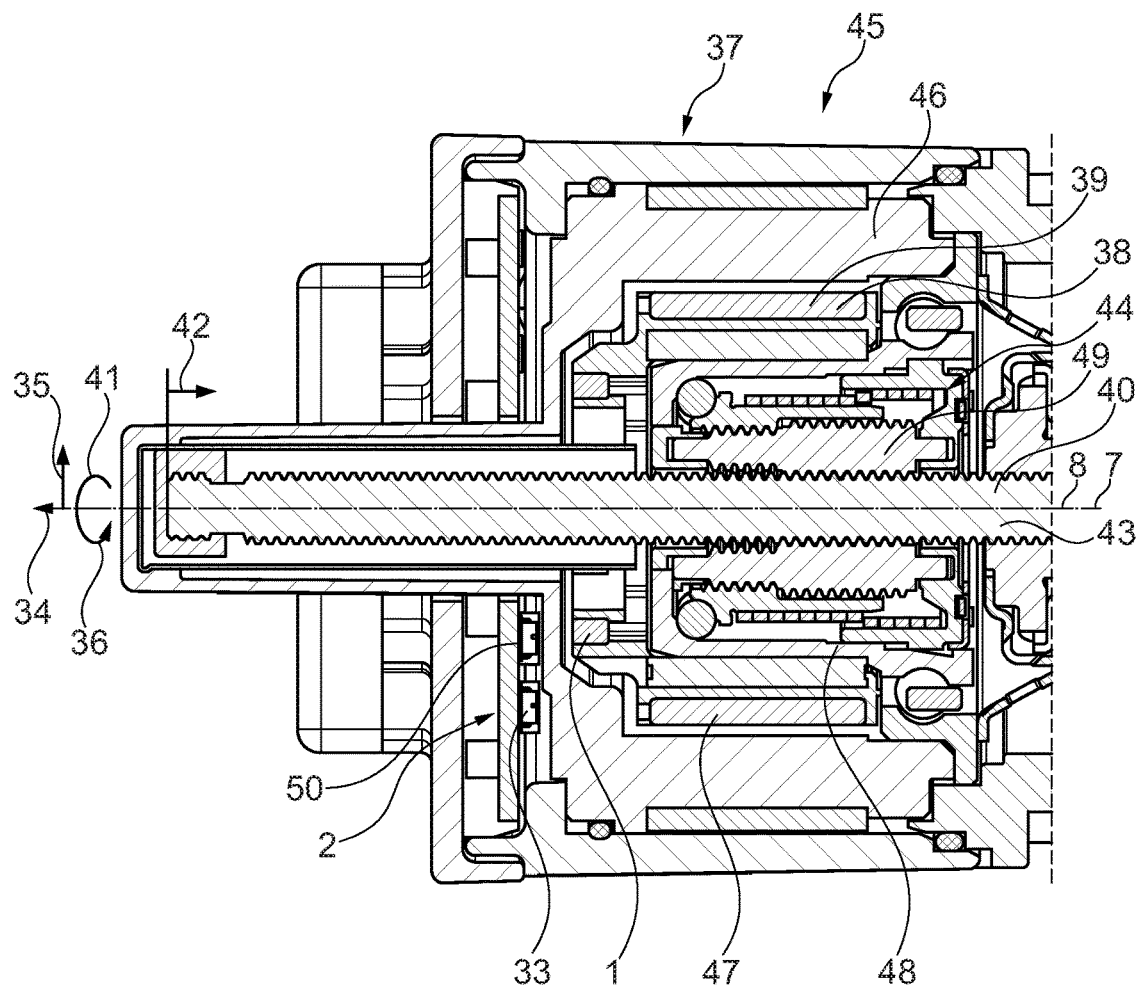
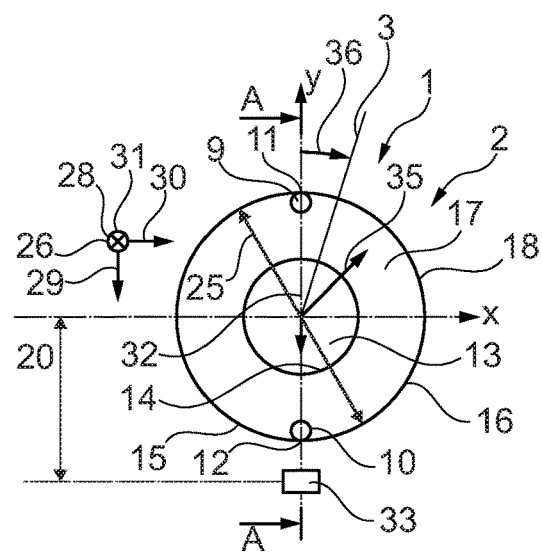
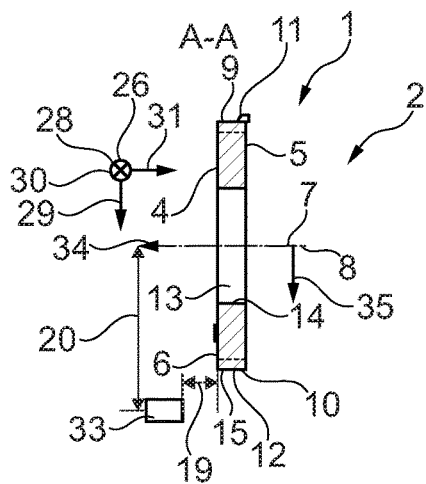
Fig. 1
Fig. 2
Fig. 3

SENSOR ASSEMBLY FOR DETERMINING A NUMBER OF ROTATIONS OF A PERMANENT MAGNET

CROSS-REFERENCE TO RELATED APPLICATIONS

This application is the United States National Phase of PCT Appln. No. PCT/DE2017/100676 filed Aug. 10, 2017, which claims priority to German Application No. DE102016216326.4 filed Aug. 30, 2016, the entire disclosures of which are incorporated by reference herein.

TECHNICAL FIELD

The disclosure concerns a sensor assembly for determining a number of rotations of a permanent magnet. The permanent magnet may be disposed rotatably relative to a positionally fixed first sensor. In an embodiment, the sensor assembly is provided for determining a number of rotations of a drive unit of an actuator, preferably a clutch actuator. The clutch actuator may be provided for actuating a clutch, for example a frictional clutch, of a motor vehicle. The drive unit may be a rotor of an electric motor that is rotationally fixedly connected to the permanent magnet, so that the number of rotations of the rotor can be determined. By using the number of rotations of the rotor, a position along the axial direction can be determined of an actuating unit of the actuator that can be displaced in an axial direction.

BACKGROUND

With clutch actuators, accurate determination of the axial position of an actuating unit or the angular position for example of a rotor is necessary. With new designs of such clutch actuators it is now necessary to dispose the sensors used for this at a distance from an axis of rotation. In this case, dynamic tolerances (i.e. differences from an initial position occurring during operation of the clutch actuator) must also be taken into account, for example an eccentricity of individual components and a changing air gap between the first sensor and a permanent magnet that is in use.

BRIEF SUMMARY

The disclosure concerns a sensor assembly for determining a number of rotations of a permanent magnet. End surfaces of the permanent magnet each lie in an X-Y-plane and a central axis extends transversely to the X-Y-plane and coaxially to an axis of rotation of the permanent magnet. The permanent magnet comprises two poles, which are disposed in the X-Y-plane on mutually opposite sides of the permanent magnet, so that the permanent magnet is magnetized diametrically. The permanent magnet comprises an opening coaxial to the central axis. An inner circumferential surface and an outer circumferential surface each extend essentially parallel to the central axis. A first sensor that is disposed positionally fixedly relative to the permanent magnet that is rotatable about the axis of rotation in an axial direction, i.e. parallel to the axis of rotation, is disposed at a distance from the permanent magnet and in a radial direction radially outside the outer circumferential surface at a distance from the axis of rotation. The distance is selected so that a vector sum of a radial flux density and a tangential flux density does not fall below a first limit value and does not exceed a second limit value.

In an embodiment, the distance between the axis of rotation and a center of the first sensor along the radial direction is determined. In an embodiment, a magnetic field of the permanent magnet comprises a magnetic flux that can be represented at each position in the magnetic field by a vector. The vector comprises a tangential magnetic field direction, a radial magnetic field direction and a normal magnetic field direction. The tangential magnetic field direction runs parallel to the X-Y-plane and parallel to an orientation of the pole. The radial magnetic field direction runs parallel to the X-Y-plane and transversely to the orientation of the pole. The normal magnetic field direction runs transversely to the tangential magnetic field direction and the radial magnetic field direction. The first sensor is a multiturn sensor that is suitable for determining a number of rotations of the permanent magnet. The first sensor detects the magnetic field directions of the magnetic flux in the radial magnetic field direction and in the tangential magnetic field direction for determining the number of rotations.

In an embodiment, the inner circumferential surface and/or the outer circumferential surface can have a shape deviating from an extent parallel to the central axis, for example a curvature or conicity or similar. The permanent magnet may have an essentially hollow cylindrical shape and a central axis extending along an axis of rotation between two mutually parallel end surfaces. The permanent magnet is magnetized diametrically, i.e. the two magnetic poles are each disposed on an outer circumferential surface on mutually opposite sides of the permanent magnet. The poles can be connected to each other by a straight line that intersects the axis of rotation of the permanent magnet. The positions of the magnetic field directions, the plane and the central axis are described further in the description of the figures.

The opening disposed coaxially to the central axis extends from the first end face to the second end face. The inner circumferential surface formed by the opening extends parallel to the central axis and may be circular. The outer circumferential surface may be circular. In an embodiment, the first limit value is 12 mT [millitesla], preferably 15 mT, and the second limit value is 37 mT, preferably 35 mT. In an embodiment, the distance is determined by $$\text{distance} = k \cdot \text{diameter of the outer circumferential surface} + R_0$$

wherein k and $R_0$ are determined depending on at least the diameter of the outer circumferential surface and the distance.

The diameter of the outer circumferential surface may be an average diameter. i.e., if there are differences from a circular shape or from an outer circumferential surface parallel to the axis of rotation, the average diameter, averaged by surface portions disposed at different diameters, can be used for determining the diameter of the outer circumferential surface. In an embodiment, the distance is determined between the adjacent points of the first sensor and the permanent magnet along the axial direction. In an embodiment, in the case of a distance of between 3 and 6 mm [millimeters] and a diameter of the outer circumferential surface of between 18 and 30 mm, k and $R_0$ are given by:

$$k = 0.36 \text{ and}$$

$$R_0 = 7.45.$$

In an embodiment, the first sensor is to be arranged with a maximum deviation of 10% from the determined distance relative to the axis of rotation. In an embodiment, the permanent magnet has a thickness of 3 to 6 mm between the end surfaces. The arrangement of the first sensor at a predetermined distance from the axis of rotation or from the outer circumferential surface of the permanent magnet surprisingly results in a smaller difference between a minimum vector sum and a maximum vector sum of the magnetic flux density in the radial magnetic field direction and the tangential magnetic field direction, in particular over the operating time or the lifetime of the permanent magnet and while taking into account the tolerances that occur in operational situations. Furthermore, less scatter of the vector sum occurs.

The tolerances occurring in the operational situation (in particular tolerances relating to the distance in the radial direction and relating to a distance in the axial direction between the first sensor and the permanent magnet), which can occur during assembly of the sensor assembly or during the disposition in an actuator and which may additionally be able to vary during rotation of the permanent magnet, result in larger errors in the measurement of the number of rotations of the permanent magnet. As a result of the arrangement of the first sensor at a calculated distance from the axis of rotation, the difference between the minimum vector sum and the maximum vector sum could be significantly reduced. In an embodiment, the sensor assembly comprises a second sensor that is disposed positionally fixedly relative to the rotatable permanent magnet, wherein the second sensor is a single turn sensor that is suitable for determining an angular position within a single rotation of the permanent magnet.

The first sensor and the second sensor may detect differently oriented magnetic fluxes. In this case the second sensor detects the exact angular position of the permanent magnet within one rotation and the first sensor detects the number of rotations. Thus an accurate angular position and a position along an axial direction of an actuator can be provided together. In this case, only one permanent magnet is necessary for the sensor assembly, the magnetic field of which is detected by two sensors. The first and the second sensors may be disposed at the same distance from the permanent magnet in the axial direction, i.e. parallel to the axis of rotation, in particular in a common X-Y-plane.

Furthermore, an actuator is proposed, at least comprising a shaft with an axis of rotation and a sensor assembly according to the disclosure, wherein the permanent magnet is disposed coaxially to the shaft and is rotationally fixedly connected to the shaft. In an embodiment, the actuator is a clutch actuator, wherein the actuator comprises a drive unit as a shaft and an actuating unit, wherein the actuating unit can be displaced along an axial direction by rotating the drive unit, wherein at least the number of rotations of the drive unit and thereby a position of the actuating unit along the axial direction can be determined by the sensor assembly.

The actuator may comprise a planetary screw threaded spindle (PSTS) as an actuating unit. An actuator of this type with a planetary screw threaded spindle is known from WO 2015/117612 A1 for example, which is hereby fully incorporated herein by reference regarding the design of the actuator proposed therein. In an embodiment, the actuator comprises an electric motor with a stator and a rotor, wherein the rotor forms the shaft.

In the case of the PSTS, the rotor is rotationally fixedly connected to a sleeve of a planetary gearbox containing the planetary screw threaded spindle and the planetary carrier supported in the sleeve, so that a rotationally fixedly supported planetary screw threaded spindle can be displaced in the axial direction when the rotor and the planetary carrier supported in the sleeve turn. The planetary screw threaded spindle forms the actuating unit of the actuator in this case.

BRIEF DESCRIPTION OF THE DRAWINGS

The disclosure and the technical environment are described in detail below using the figures. The figures show particularly preferred exemplary embodiments, to which the disclosure is not limited, however. For example, it is to be noted that the figures and in particular the represented dimensional relationships are only schematic. Identical reference characters denote identical objects. In the figures:

FIG. 1 shows an actuator with a sensor assembly in a sectional side view;

FIG. 2 shows a sensor assembly in a top view;

FIG. 3 shows the sensor assembly from FIG. 2 in a sectional side view;

DETAILED DESCRIPTION

Figure 4:
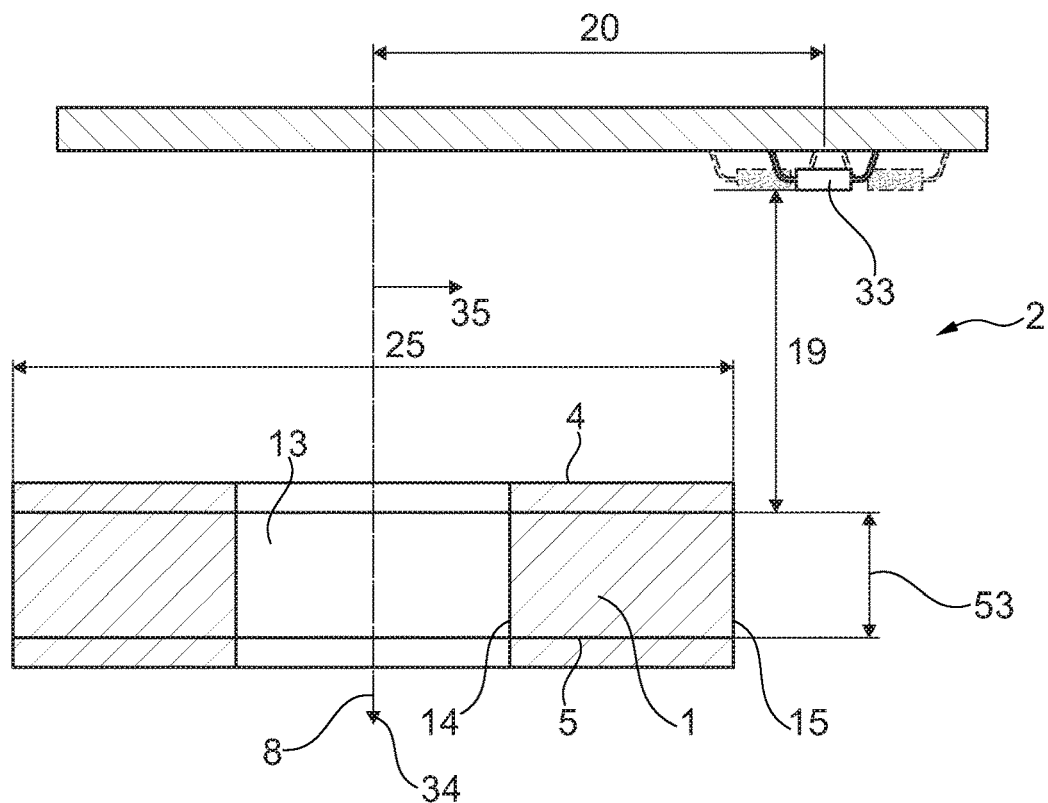
FIG. 4 shows the sensor assembly from FIGS. 2 and 3 in a further sectional side view.

FIG. 1 shows an actuator 37 with a sensor assembly 2 in a sectional side view. A hollow cylindrical permanent magnet 1 is disposed coaxially to an axis of rotation 8. A second sensor 50 disposed positionally fixedly relative to the rotatable permanent magnet 1 is used for determining the angular position of the permanent magnet 1. The second sensor 50 is a single turn sensor with a measurement range of 360 degrees. A single turn sensor is a sensor that cannot detect a number of rotations 36, as it only resolves an angular range of 360 degrees (it thus detects an angular position within one rotation 36).

The second sensor 50 is disposed at a distance from the axis of rotation 8 in a radial direction 35. The second sensor 50 is thus not disposed on the axis of rotation 8 of the permanent magnet 1, but at a distance from the axis of rotation 8. The second sensor 50 is disposed at a distance from the permanent magnet 1 in the axial direction 34, i.e. parallel to the axis of rotation 8.

The sensor assembly 2 further comprises a first sensor 33 that is disposed positionally fixedly relative to the rotatable permanent magnet 1, wherein the first sensor 33 is a multiturn sensor that is suitable for determining a number of rotations 36 of the permanent magnet 1. The first sensor 33 is disposed at a distance 19 (ref. FIGS. 2-4) from the permanent magnet 1 in the axial direction 34, i.e. parallel to the axis of rotation 8, and radially outwardly from the second sensor 50 in the radial direction 35 and at a distance 20 (ref. FIGS. 3-4) from the axis of rotation 8. The first sensor 33 detects the magnetic field directions of the magnetic flux in the radial magnetic field direction 30 (ref. FIGS. 2-3) and the tangential magnetic field direction 29 (ref. FIGS. 2-3) for determining the number of rotations 36.

The second sensor 50 thus detects the exact angular position of the permanent magnet 1 within one rotation 36 and the first sensor 33 detects the number of rotations 36. Thus with both sensors an angular position or a position 42 along an axial direction 34 of an actuator 37 can be provided. In this case, only one permanent magnet 1 is necessary for the sensor assembly 2, the magnetic field 26 of which is detected by two sensors 33, 50. The actuator 37 comprises a shaft 38 with an axis of rotation 8 and a sensor assembly 2, wherein the permanent magnet 1 is disposed coaxially to the shaft 38 and is rotationally fixedly connected to the shaft 38.

The actuator 37 is a clutch actuator, wherein the actuator 37 comprises a drive unit 39 as the shaft 38 and an actuating unit 40, wherein the actuating unit 40 can be displaced along the axial direction 34 by a rotation 41 of the drive unit 39, wherein at least the number of rotations of the drive unit 39 can be determined by the sensor assembly 2 and thereby a position 42 of the actuating unit 40 along the axial direction 34 can be determined. The actuator 37 comprises a planetary screw threaded spindle (PSTS) 43 as an actuating unit 40. An actuator 37 of this type with a planetary screw threaded spindle 43 is known from WO 2015/117612 A1, which is fully incorporated herein by reference regarding the design of the actuator proposed therein.

The actuator 37 comprises an electric motor 45 with a stator 46 and a rotor 47, wherein the rotor 47 forms the shaft 38. The rotor 47 is rotationally fixedly connected to a sleeve 48 of the planetary gearbox 44 enclosing the planetary screw threaded spindle 43, and to the planetary carrier 49 supported in the sleeve 48, so that a rotationally fixedly supported planetary screw threaded spindle 43 can be displaced in the axial direction 34 by a rotation 41 of the rotor 47 and the planetary carrier 49 supported in the sleeve 48. The planetary screw threaded spindle 43 forms the actuating unit 40 of the actuator 37.

FIG. 2 shows a sensor assembly 2 in a top view along the axial direction 34. FIG. 3 shows the sensor assembly 2 of FIG. 2 in a sectional side view A-A. FIGS. 2 and 3 are described together below.

The sensor assembly 2 comprises the first sensor 33 and the permanent magnet 1. The end surfaces 4, 5 of the permanent magnet 1 lie in an X-Y-plane 6 and a central axis 7 extends transversely to the X-Y-plane 6 and coaxially to an axis of rotation 8 of the permanent magnet 1. The permanent magnet 1 comprises exactly two poles 9, 10 that are disposed in the X-Y-plane 6 on mutually opposite sides 11, 12 of the permanent magnet 1, so that the permanent magnet 1 is magnetized diametrically. A magnetic field 26 of the permanent magnet 1 comprises a magnetic flux that is represented at any position 28 in the magnetic field 26 by a vector. The vector comprises a tangential magnetic field direction 29, a radial magnetic field direction 30 and a normal (axial) magnetic field direction 31; wherein the tangential magnetic field direction 29 runs parallel to the X-Y-plane 6 and parallel to the orientation 32 of the poles 9, 10; wherein the radial magnetic field direction 30 runs parallel to the X-Y-plane 6 and transversely to the orientation 32 of the poles 9, 10; wherein the normal magnetic field direction 31 runs transversely to the tangential magnetic field direction 29 and the radial magnetic field direction 30. A first sensor 33 that is disposed positionally fixedly relative to the rotatable permanent magnet 1 detects the magnetic field directions 29, 30, 31 of the magnetic flux in the tangential magnetic field direction 29 and in the radial magnetic field direction 30 for determining the number of rotations 36 of the permanent magnet 1.

The permanent magnet 1 represented here is a hollow cylinder with an external circumferential line 16 of circular form 18, i.e. with a diameter 25 and a central axis 7 extending between two mutually parallel end surfaces 4, 5 along an axis of rotation 8. The permanent magnet 1 is magnetized diametrically, i.e. the two magnetic poles 9, 10 are each disposed on the outer circumferential surface 15 on mutually opposite sides 11, 12 of the permanent magnet 1. The poles 9, 10 can be connected to each other by a straight line that intersects the central axis 8 of the permanent magnet 1, (see arrow for orientation 32).

The first sensor 33 is disposed in a radial direction 35 at a distance 20 from the axis of rotation 8 and from the permanent magnet or the outer circumferential surface 15 thereof. The first sensor 33 is thus not disposed on the axis of rotation 8 of the permanent magnet 1, but at a distance 20 from the axis of rotation 8. The first sensor 33 is disposed at a distance 19 from the permanent magnet 1 in the axial direction 34, i.e. parallel to the axis of rotation 8. The permanent magnet 1 represented here comprises an opening 13 that is coaxial to the central axis 7, wherein an inner circumferential surface 14 and an outer circumferential surface 15 each extend parallel to the central axis 7.

FIG. 4 shows the sensor assembly 2 of FIGS. 2 and 3 in a further sectional side view. The distance 19 is determined between the adjacent points of the first sensor 33 and the permanent magnet 1 along the axial direction 34. The permanent magnet 1 further has a thickness 53 of 3 to 6 mm between the end surfaces 4, 5. The distance 20 along the radial direction 35 is determined between the axis of rotation 8 and a center of the first sensor 33.

The tolerances occurring in the operational situation (in particular tolerances regarding the distance 20 in the radial direction 35 and regarding a distance 19 in the axial direction 34 between the first sensor 33 and the permanent magnet 1), which can occur during assembly of the sensor assembly 2 or when disposing the sensor assembly 2 in an actuator 37 and which may additionally vary when the permanent magnet 1 is rotating (indicated here by shading), result in larger errors when measuring the number of rotations of the permanent magnet 1. As a result of the arrangement of the first sensor 33 at a calculated distance 20 from the axis of rotation 8 or from the outer circumferential surface 15 of the permanent magnet 1, the difference between the minimum vector sum and the maximum vector sum could be reduced. Furthermore, less scatter of the vector sum occurs.

Figure 5:
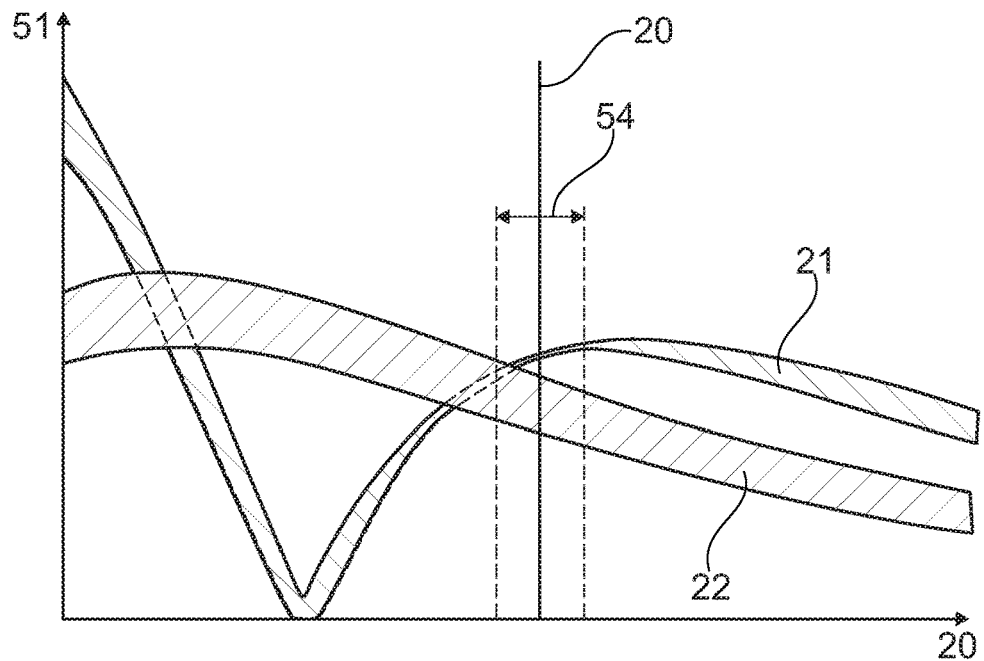
FIG. 5 shows the profile of the magnetic flux density of the magnetic flux in the magnetic field directions against a distance from the axis of rotation.

FIG. 5 shows the profile of the magnetic flux density 51 of the magnetic flux in the magnetic field directions 29, 30 against a distance 20 of the first sensor 33 from the axis of rotation 8. The broad curves for the radial flux density 21 and the tangential flux density 22 already take into account a possible difference of a distance 19 of +/−0.5 mm (see shaded representation of the permanent magnet in FIG. 4). The first sensor 33 is to be arranged in said region 54 about an (ideal) distance 20 relative to the axis of rotation 33 (see shaded representation of the first sensor 33 in FIG. 4).

REFERENCE NUMERALS 1 permanent magnet
2 sensor assembly
3 angular position
4 first end surface
5 second end surface
6 X-Y-plane
7 central axis
8 axis of rotation
9 first pole
10 second pole
11 first side
12 second side
13 opening
14 inner circumferential surface
15 outer circumferential surface
16 external circumferential line 17 cross section
18 circular shape
19 distance
20 distance
21 radial flux density
22 tangential flux density
23 first limit value
24 second limit value
25 diameter
26 magnetic field
28 position
29 tangential magnetic field direction
30 radial magnetic field direction
31 normal magnetic field direction
32 orientation
33 first sensor
34 axial direction
35 radial direction
36 rotation
37 actuator
38 shaft
39 drive unit
40 actuating unit
41 rotation
42 position
43 planetary screw threaded spindle
44 planetary gearbox
45 electric motor
46 stator
47 rotor
48 sleeve
49 planetary carrier
50 second sensor
51 magnetic flux density
53 thickness
54 region

The invention claimed is:

1. A sensor assembly for determining a number of rotations of a permanent magnet, the permanent magnet comprising:
an axis of rotation;
end surfaces lying in an X-Y plane;
a central axis extending transversely to the X-Y plane and coaxially to the axis of rotation;
exactly two poles disposed in the X-Y plane on mutually opposite sides of the permanent magnet, so that the permanent magnet is magnetized diametrically;
an opening coaxial to the central axis;
an inner circumferential surface and an outer circumferential surface each extending essentially parallel to the central axis; wherein the sensor assembly comprises:
a first sensor axially fixed and rotationally displaceable relative to the permanent magnet, wherein:
the first sensor is disposed at a first distance axially offset from the permanent magnet and at a second distance radially offset from the axis of rotation and outside of the outer circumferential surface; and,
the second distance is selected so that a vector sum of a radial flux density and a tangential flux density is not less than a first limit value and does not exceed a second limit value.

2. The sensor assembly of claim 1 wherein:
the permanent magnet comprises a magnetic field;
the magnetic field comprises a magnetic flux that can be represented at any position in the magnetic field by a vector;
the vector comprises a tangential magnetic field direction, a radial magnetic field direction and a normal magnetic field direction;
the tangential magnetic field direction runs parallel to the X-Y plane and parallel to an orientation of the poles;
the radial magnetic field direction runs parallel to the X-Y plane and transversely to the orientation of the poles;
the normal magnetic field direction runs transversely to the tangential magnetic field direction and the radial magnetic field direction;
the first sensor is a multiturn sensor that is suitable for determining a number of rotations of the permanent magnet; and,
the first sensor detects the radial magnetic field direction and the tangential magnetic field direction of the magnetic flux for determining the number of rotations.

3. The sensor assembly of claim 2 wherein the first limit value is 12 mT [millitesla] and the second limit value is 37 mT.

4. The sensor assembly of claim 2 wherein:
the second distance (d2) is determined by d2=k*diameter of the outer circumferential surface+R0; and,
k and R0 are determined as a function of at least the diameter of the outer circumferential surface and the first distance.

5. The sensor assembly of claim 4 wherein, for a first distance of between 3 and 6 mm [millimeters] and a diameter of the outer circumferential surface of between 18 and 30 mm, k and R0 are given by k=0.36 and R0=7.45.

6. The sensor assembly of claim 4 wherein the permanent magnet has a thickness between the end surfaces of 3 to 6 mm.

7. An actuator comprising:
a shaft with an axis of rotation; and
the sensor assembly of claim 1, wherein the permanent magnet is disposed coaxial to the shaft and rotationally fixed to the shaft.

8. The actuator of claim 7 wherein:
the actuator is a clutch actuator;
the actuator comprises a drive unit as the shaft and an actuating unit;
the actuating unit can be displaced along an axial direction by a rotation of the drive unit; and,
a number of rotations of the drive unit and thereby a position of the actuating unit along the axial direction can be determined by the sensor assembly.

* * * * *